United States Patent [19]

Smazik et al.

[11] Patent Number: 4,890,642

[45] Date of Patent: Jan. 2, 1990

[54] DISCONNECT FOR A BAG VALVE

[75] Inventors: Kenneth G. Smazik, Marietta, Ga.; Alfred A. Schroeder, San Antonio, Tex.

[73] Assignee: The Coca-Cola Company, Atlanta, Ga.

[21] Appl. No.: 285,139

[22] Filed: Dec. 16, 1988

[51] Int. Cl.$^4$ .............................................. F16L 29/00
[52] U.S. Cl. ................................. 137/614.03; 251/339
[58] Field of Search .............. 137/614, 614.02, 614.03, 137/614.04; 251/149.4, 339, 340, 341, 343, 354

[56] References Cited

U.S. PATENT DOCUMENTS

| | | | |
|---|---|---|---|
| 2,962,303 | 11/1960 | Ramberg et al. | 137/614.04 |
| 3,117,592 | 1/1964 | Abbey et al. | 137/614.03 |
| 3,871,404 | 3/1975 | Courant | 137/614.03 |
| 4,137,930 | 2/1979 | Scholle | 137/614.03 X |
| 4,445,539 | 5/1984 | Credle | 137/614.03 |
| 4,757,919 | 7/1988 | Smazik et al. | 222/145 |

Primary Examiner—John Fox
Attorney, Agent, or Firm—Thomas R. Boston; W. Dexter Brooks

[57] ABSTRACT

A disconnect for coupling a postmix dispenser juice concentrate line to a bag valve of a juice concentrate bag-in-box container. The disconnect includes an open passageway therethrough with no areas or elements therein that can trap concentrate with pulp. The disconnect includes a hollow body with a juice concentrate passageway therethrough, a stationary poppet valve therein, a movable sleeve with a valve seat, and a spring biasing the sleeve into contact with the valve to close the passageway. The spring is located adjacent the outside of the sleeve to keep the spring out of the passageway.

11 Claims, 2 Drawing Sheets

DISCONNECT FOR A BAG VALVE

BACKGROUND OF THE INVENTION

This invention relates to postmix beverage dispensing and in particular to a disconnect for coupling a beverage concentrate line from a postmix dispenser to a beverage concentrate container.

Postmix concentrate systems are known in which the concentrate is mixed with water in a desired ratio to produce the beverage. When the beverage is juice, the juice may or may not contain pulp. The use of juice containing pulp causes problems because the pulp can clog valves and lines.

It is an object of this invention to provide an improved disconnect.

It is a further object of this invention to provide a disconnect that is less expensive.

It is another object of this invention to provide a disconnect that causes a smaller pressure drop in the liquid flow therethrough.

It is another object of this invention to provide a disconnect that will not trap juice concentrate with pulp and that will not clog up.

SUMMARY OF THE INVENTION

A disconnect for connecting a concentrate line of a postmix dispenser to a container (such as a bag-in-box container) of the concentrate. The disconnect includes a hollow housing or body with a concentrate passageway therethrough, a stationary poppet therein and a movable sleeve with a valve seat biased against the poppet by a spring located adjacent the outside of the sleeve. This arrangement provides for a completely open concentrate passageway therethrough. When used with orange juice having pulp, there are no areas or elements therein where the juice with pulp can "hang up" or get trapped. Also, the sleeve has an O-ring which slides against a continuous surface, thus, the O-ring is not subject to damage as in certain prior art wherein the O-ring must move across the edges of an opening to a passageway.

Thus, a major advantage of this invention is to provide a disconnect having an open passageway therethrough such that juice concentrate with pulp can not get trapped therein.

BRIEF DESCRIPTION OF THE DRAWINGS

The present invention will be more fully understood from the detailed description below when read in connection with the accompanying drawings wherein like reference numerals refer to like elements and wherein.

DETAILED DESCRIPTION OF THE PREFERRED EMBODIMENTS

Figure 1:
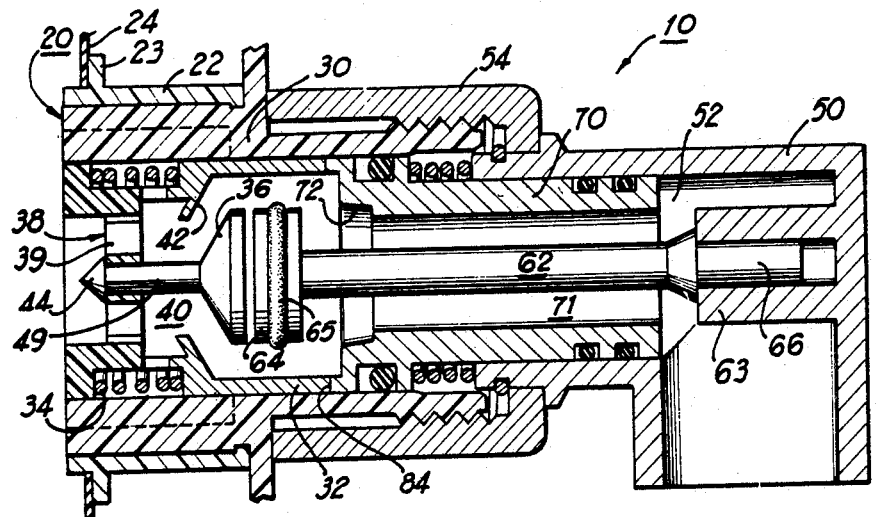
FIG. 1 is a cross-sectional view through the disconnect of this invention, shown fully connected to a bag valve and in open position.
Figure 2:
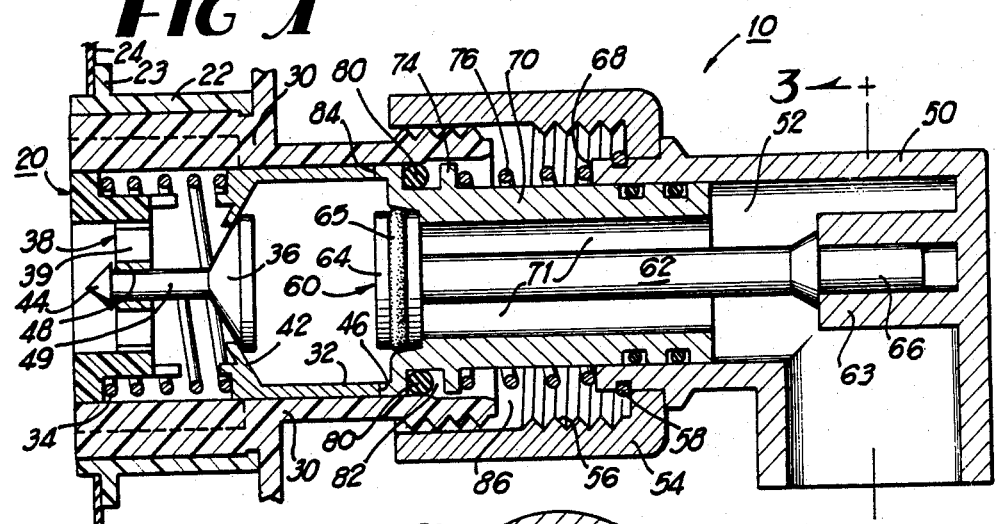
FIG. 2 is a cross-sectional view as in FIG. 1, but with the disconnect just initially attached to the bag valve and still in closed position.
Figure 3:
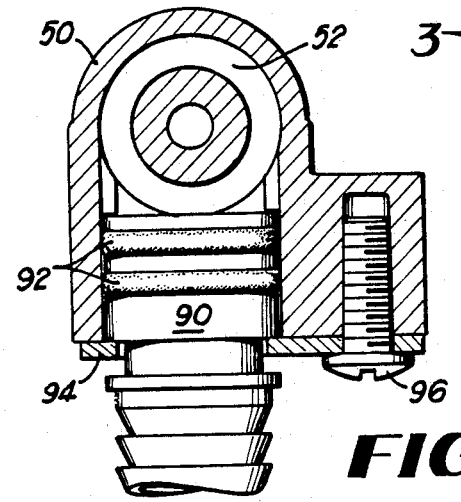
FIG. 3 is a partly cross-sectional view taken along line 3—3 of FIG. 2 and showing a concentrate hose or conduit connector attached to the disconnect.

With reference now to the drawings, FIGS. 1-3 show a disconnect 10 according to the present invention for coupling to a bag valve 20 of a concentrate bag 24, such as for orange juice with pulp.

Figure 4:
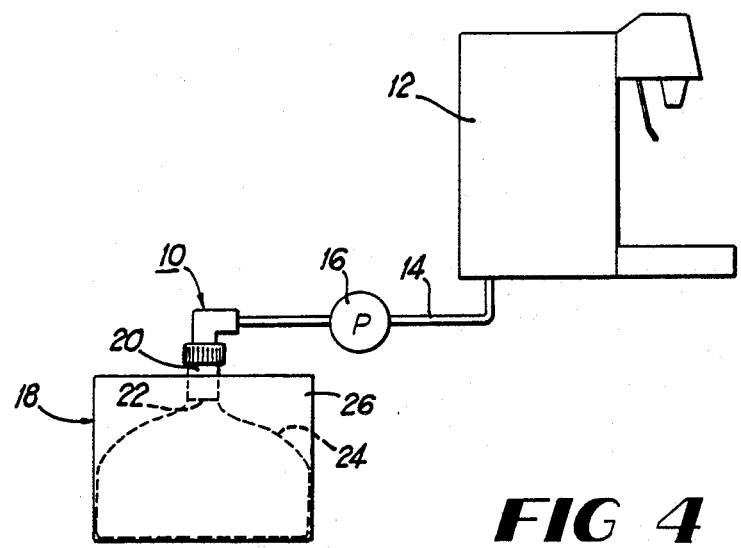
FIG. 4 is a diagrammatic view of an overall system in which the disconnect can be used.

FIG. 4 shows one general overall arrangement in which the disconnect 10 can be used including a postmix dispenser 12, a concentrate conduit 14, a pump 16, and a concentrate bag-in-box package 18. The package 18 includes a bag valve 20 connected to a bag spout 22, connected in turn to a collapsible bag 24 in a paperboard box 26. The box 26 need not be used; for example, the bag 24 can be placed in a refrigerator. Various concentrates can be used; the preferred one is orange juice with pulp.

FIGS. 1 and 2 show one embodiment of the disconnect 10 of the present invention connected to the bag valve 20. Before describing the disconnect 10 in detail, a brief description of the bag valve 20 will be set forth.

The bag valve 20 can be snapped or screwed or otherwise connected to a bag spout 22 that includes a flange 23 heat sealed to a wall of the bag 24. The bag valve 20 includes a hollow, cylindrical body 30 having a juice concentrate passageway 40 therethrough, a movable sleeve 32, a spring 34, a poppet 36 connected to the body 30 in a fixed position therein, and a spider 38 with several spaced-apart arms 39 to support the poppet while allowing juice concentrate to flow through the passageway 40. The sleeve 32 includes a valve seat 42 for the poppet 36 and includes an annular end or edge 46 (to contact an annular end or edge 84 of a sleeve 70 of the disconnect, as will be described in detail below). The spider 38 can be formed integrally with the body 30 or it can be formed as a separate element that is then permanently attached to the body. The spider includes an axial opening 48 through which the anchor 44 on the end of the stem 49 of the poppet is pushed to lock the poppet to the spider 38 and thus to the body 30 of the bag valve in a fixed position. The bag valve 20 is opened and closed by movement of the sleeve 32 against the spring 34.

The disconnect 10 of the present invention will now be described. The disconnect 10 includes a disconnect body 50 having a juice concentrate passageway 52 therethrough which is open to avoid having any areas or elements or features therein that could trap concentrate with pulp. The passageway 52 is preferably L-shaped, although other shapes can be used. A coupling nut 54 is rotatably connected to the outside surface of a proximal end 68 of the body 50 and includes internal screw threads 56 for connecting the disconnect 10 to the bag valve 20. The nut 54 is held to the body 50 by means of an annular wire 58 located in an annular groove on the outside surface of the body 50. The disconnect 10 also includes a poppet 60 fixedly connected to the body 50. The poppet 60 comprises a stem 62 and a head 64 having an O-ring 65 thereon. The stem 62 is fixed (by welding, for example) to a stem support 63 on the body 50 at the distal end 66 of the stem and extends concentrically through a portion of the passageway 52 and terminates at the head 64 at a location beyond the proximal end 68 of the body 50. A disconnect sleeve 70 is positioned inside the proximal end of the body 50 in sliding and sealing engagement with the inside surface of the body 50 and includes a passageway 71 therethrough and a poppet seat 72 on its proximal end in sealing engagement with O-ring 65 of the poppet head 64. The sleeve 70 has a spring retaining flange 74 on its external surface and a spring 76 is captured between the flange 74 and the proximal end 68 of the body 50 and is located around the outside surface of the sleeve 70, such that the sleeve 70 can be moved toward the body 50 and away from the poppet heat 64 against the force of the spring 76 to open the passageway 52.

In operation, when it is desired to dispense the juice concentrate from the bag 24 and feed it to a dispenser 12, the disconnect 10 is attached to the bag valve 20 as shown in FIG. 2 by screwing the nut 54 down onto the bag valve until it bottoms out on the bag valve in the position shown in FIG. 1 at which time the sleeve 70 has moved away from the poppet head 64 to provide an open passageway through the disconnect 10. At the same time, the sleeve 32 in the bag valve 20 has moved away from the poppet 36 to also provide a passageway through the bag valve 20. The disconnect sleeve 70 includes an O-ring 80 in an O-ring groove 82 on its outer surface to provide a seal between the connector 10 and the bag valve 20. It is noted that the O-ring 80 provides a seal prior to the time the poppets open, to prevent leaking. The connector 10 has an annular opening 86 between the sleeve 70 and the nut 54, into which bag valve 30 fits when the two parts are coupled together.

FIG. 3 shows a barbed fitting 90 having O-rings 92 attached to the disconnect by means of a retainer plate 94 and a bolt 96. The juice concentrate conduit 14 is pushed onto the barbed fitting. Preferably, a barbed extension is made an integral part of the disconnect body to avoid the need for these separate elements.

Figure 5:
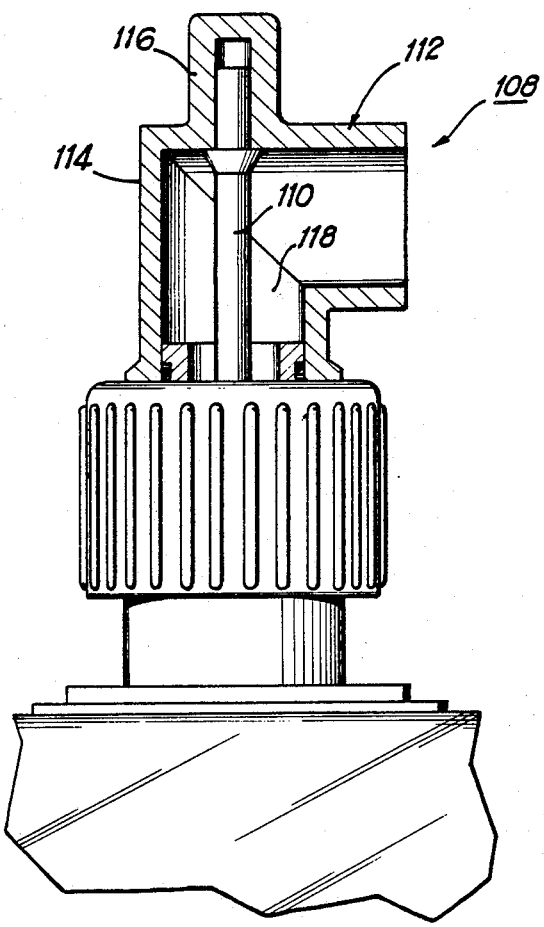
FIG. 5 is a partial cross-sectional view similar to FIG. 1, but showing a preferred embodiment of the disconnect.

FIG. 5 shows a preferred embodiment of the disconnect 108 of the present invention which is identical to the embodiment shown in FIGS. 1 and 2 with the exception that the stem 110 of the poppet valve 112 is fixed to a wall portion 116 of the disconnect body 114 without the need for the stem support 63. The wall portion 116 is thicker than in the embodiment of FIGS. 1 and 2 so as to be able to support the poppet valve 112 without the need for any structure in the passageway 118. The passageway 118 can, if desired, smoothly curve through the body 114 so as to provide a substantially constant cross-sectional area along the entire length of the passageway to help avoid any areas where concentrate can be trapped.

While the preferred embodiment of this invention has been described above in detail, it is to be understood that variations and modifications can be made therein without departing from the spirit and scope of the present invention. While a preferred use of this invention is for use with orange juice having pulp, it also has uses and advantages with other liquids including juices without pulp and soft drinks syrups. The disconnect is less expensive, has few parts, and the pressure drop therethrough is lower.

What is claimed is:

1. A disconnect coupling for a juice concentrate conduit comprising:
   (a) a disconnect body having an L-shaped juice concentrate passageway therethrough;
   (b) a coupling nut rotatable connected to the outside surface of a proximal end of said body and having internal screw threads;
   (c) a poppet valve connected to said disconnect body in fixed position therein and including a stem and a head, with said stem being fixedly connected to said body and extending in said passageway and terminating at said head at a location beyond said proximal end of said body, said stem being parallel to said passageway in the distal end of said sleeve and said head being at one end of said stem and said stem being connected to said body soley by the other end of said stem extending into contact with said body;
   (d) a disconnect sleeve slidably mounted inside of said passageway in said disconnect body in sealing engagement with an inside surface of said proximal end of said body, said sleeve having: (i) a completely open passageway therethrough in communication with said body passageway (ii) a poppet valve seat on its proximal end in sealing engagement wih said poppet valve head, and (iii) a spring retaining flange on its external surface; and
   (e) a spring mounted on the outside of said disconnect sleeve between said flange and the distal end of said body, such that said sleeve can be moved toward said body and away from said poppet valve head, against said spring, to open said passageway;
   (f) an annular O-ring groove in an outside surface of said disconnect sleeve adjacent its proximal end and an O-ring in said groove facing the inside surface of and protected by said coupling nut; and
   (g) an annular opening between the outside surface of said disconnect sleeve and the inside surface of said nut.

2. The disconnect as recited in claim 1 wherein said disconnect sleeve is a hollow cylinder and wherein said stem is concentric with said disconnect sleeve passageway.

3. The disconnect as recited in claim 1 wherein said nut is connected to the outside surface of said proximal end of said body and said sleeve is in sealing, sliding contact with an inside surface of said proximal end of said body.

4. The disconnect as recited in claim 1 wherein said disconnect sleeve is a hollow cylinder and wherein said stem is concentric with said disconnect sleeve passageway.

5. The disconnect as recited in claim 1 connected to a bag valve for a juice concentrate bag, said bag valve having a cylindrical, externally screw threaded body received in said annular opening and screw threaded to said nut.

6. The disconnect as recited in claim 1 wherein said stem is concentric to said proximal end of said passageway.

7. A disconnect for coupling a juice concentrate conduit to a bag valve of a juice concentrate bag comprising:
   (a) a disconnect body having a juice concentrate passageway therethrough;
   (b) a coupling nut rotatable connected to the outside surface of a proximal end of said body and having internal screw threads, for connecting said disconnect to a bag valve;
   (c) a poppet valve connected to said disconnect body in fixed position therein and including a stem and a head, with said stem being fixedly connected to said body and extending in said passageway and terminating at said head at a location beyond said proximal end of said body;
   (d) a disconnect sleeve slidably mounted inside of said passageway in said disconnect body in sealing engagement with an inside surface of said proximal end of said body, said sleeve having: (i) a completely open passageway therethrough in communication with said body passageway, (ii) a poppet valve seat on its proximal end in sealing engagement with said poppet valve head, and (iii) a spring retaining flange on its external surface;
(e) a spring mounted on the outside of said disconnect sleeve between said flange and the distal end of said body, such that said sleeve can be moved toward said body and away from said poppet valve head, against said spring, to open said passageway;
(f) an annular opening between the outside surface of said disconnect sleeve and the inside surface of said nut, to receive a cylindrical, externally screw threaded body of a bag valve; and
(g) a bag valve of a juice concentrate bag connected to said disconnect, said bag valve including a hollow, cylinderical bag valve body having a passageway therethrough, said bag valve body having external screw threads and being received in said annular opening in mating screw threaded relationship to said nut, said bag valve including a hollow, cylindrical, slidable, sleeve inside of said bag valve body, said bag valve sleeve including a valve seat, a poppet valve connected to said bag valve body in fixed position therein, a spring biasing said sleeve into seating contact with said poppet valve, and said sleeve having an annular proximal end having the same diameter as an annular proximal end of said disconnect sleeve, such that said sleeve ends contact each other when said disconnect body is initially connected to said bag valve and such that as said disconnect is screwed onto said bag valve, both of said sleeves are caused to move against said springs and away from their respective poppet valves, thus opening said passageways.

8. The disconnect as recited in claim 7 wherein said disconnect body passageway in L-shaped.

9. The disconnect as recited in claim 8 wherein said disconnect passageway smoothly curves between the two legs of the L-shaped passageway.

10. The disconnect as recited in claim 9 wherein said stem is concentric with one leg of said passageway and connects directly to a thickened wall portion of said disconnect body which wall portion forms a smooth unbroken wall surface of said passageway, such that all stem support structure is located outside of said passageway.

11. The disconnect as recited in claim 10 wherein said disconnect sleeve is a hollow cylinder and wherein said stem is concentric with said concentric sleeve passageway.

* * * * *